US006561861B2

(12) United States Patent
Ikuma et al.

(10) Patent No.: US 6,561,861 B2
(45) Date of Patent: May 13, 2003

(54) OUTBOARD MOTOR

(75) Inventors: Tomonori Ikuma, Wako (JP); Tetsu Wada, Wako (JP)

(73) Assignee: Honda Giken Kogyo Kabushiki Kaisha (JP)

(*) Notice: Subject to any disclaimer, the term of this patent is extended or adjusted under 35 U.S.C. 154(b) by 0 days.

(21) Appl. No.: 10/061,123

(22) Filed: Jan. 31, 2002

(65) Prior Publication Data

US 2002/0111086 A1 Aug. 15, 2002

(30) Foreign Application Priority Data

Feb. 13, 2001 (JP) ....................................... 2001-036081

(51) Int. Cl.[7] .......................... B63H 21/10; B60K 41/00

(52) U.S. Cl. ........................... 440/88; 440/87; 123/336; 123/400

(58) Field of Search ............................. 440/88, 84, 87; 123/336, 400

(56) References Cited

U.S. PATENT DOCUMENTS 5,762,044 A * 6/1998 Hollister et al. ............ 123/400

6,125,820 A * 10/2000 Hiraoka ...................... 123/336

FOREIGN PATENT DOCUMENTS

JP 2577611 11/1993

* cited by examiner

*Primary Examiner*—Jesus D. Sotelo
(74) *Attorney, Agent, or Firm*—Adams & Wilks

(57) ABSTRACT

An outboard motor includes an engine, an induction silencer disposed above the engine, a throttle valve device disposed adjacent the induction silencer, an intake manifold disposed adjacent the throttle valve device, an engine cover for covering the engine, the induction silencer, the throttle valve device, and the intake manifold, and a control cable for opening and closing a throttle valve of the throttle valve device. The induction silencer includes a connecting port communicating with an upstream portion of the throttle valve device. The throttle valve device has a downstream portion communicating with an upstream portion of the intake manifold. The control cable includes a first cable portion extending over an upper surface of the induction silencer.

4 Claims, 6 Drawing Sheets

OUTBOARD MOTOR

FIELD OF THE INVENTION

The present invention relates generally to an outboard motor, and in particular to positioning of a control cable for controlling an amount by which a throttle valve of a throttle valve device of the outboard motor is opened.

BACKGROUND OF THE INVENTION

Known outboard motors for boats include engines having vertically extending crankshafts, and auxiliary devices attached to the engines. The engines and auxiliary devices thereof are covered with engine covers. Under covers are provided below the engine covers. Provided below the under covers are extension cases. Gearboxes are mounted under the extension cases. Vertical shafts extend downwardly from the crankshafts. The vertical shafts are connected to gears disposed within the gearboxes. Motive power supplied from the engines is transmitted through the vertical shafts and the gears to propellers provided behind the gearboxes to thereby thrust the boats. The outboard motors are mounted to sterns of the boats via stern brackets in such a manner as to pivot in an up-and-down direction.

Amounts by which throttle valves of carburetors are opened are controlled by control cables to be operated by throttle grips positioned on hulls of the boats. Recently, large-sized engines for outboard motors have become popular. For such a large-sized engine, throttle valves are often positioned in a rear part of an engine compartment of an outboard motor, as disclosed in Japanese Utility Model Registration Publication No. 2577611.

The control cable extends through an engine cover out of the outboard motor. Within the engine cover, there are closely accommodated auxiliary devices of an engine as well as the carburetors to thereby provide a limited space for disposition of the control cable. The control cable should thus inevitably extend through the auxiliary devices, or otherwise be disposed in a tortuous line to avoid undesirable contact with the auxiliary devices.

The cable thus arranged is difficult to operate.

SUMMARY OF THE INVENTION

An object of the present invention is to provide an outboard motor including a throttle valve device connected to a control cable disposed in a less complicated configuration within a small space formed in an engine compartment, such that the throttle valve is smoothly operated.

According to an aspect of the present invention, there is provided an outboard motor comprising: an engine; an induction silencer disposed above the engine; a throttle valve device disposed adjacent the induction silencer; an intake manifold disposed adjacent the throttle valve device; an engine cover for covering the engine, the induction silencer, the throttle valve device, and the intake manifold; and a control cable for opening and closing a throttle valve of the throttle valve device; the induction silencer including a connecting port communicating with an upstream portion of the throttle valve device; the throttle valve device having a downstream portion communicating with an upstream portion of the intake manifold; the control cable including a first cable portion extending over an upper surface of the induction silencer.

The control cable is disposed on the surface of the induction silencer positioned adjacent the throttle valve device. This means that a large space formed above the induction silencer is effectively used for disposition of the control cable.

This arrangement eliminates the need for the control cable to be disposed alongside a cylinder block or a cylinder head of the engine. Further, there is no need to provide the cylinder block and the like with any particular member for clamping the control cable against the cylinder block.

The control cable does not extend around the engine, and hence the engine cover has a reduced width to thereby provide a decreased size of the outboard motor. The thus arranged outboard motor provides an improved outer appearance.

In a preferred form of the present invention, the first cable portion extends in the front-and-rear direction of the induction silencer.

This arrangement has the advantage that the control cable does not interfere with the engine and auxiliary devices attached to the engine.

Because the control cable extends in the front-and-rear direction of the induction silencer, the control cable can be readily replaced with new one with the engine cover removed.

In a further preferred form of the present invention, the control cable further includes a second cable portion extending in the right-and-left direction of the induction silencer.

In a still further preferred form of the present invention, the first cable portion is received in an engagement groove formed on the upper surface of the induction silencer.

Formation of the engagement groove makes it possible to hold the control cable to the surface of the upper member.

BRIEF DESCRIPTION OF THE DRAWINGS

A certain preferred embodiments of the present invention will hereinafter be described in detail, by way of example only, with reference to the accompanying drawings, in which.

DETAILED DESCRIPTION OF THE PREFERRED EMBODIMENTS

Figure 1:
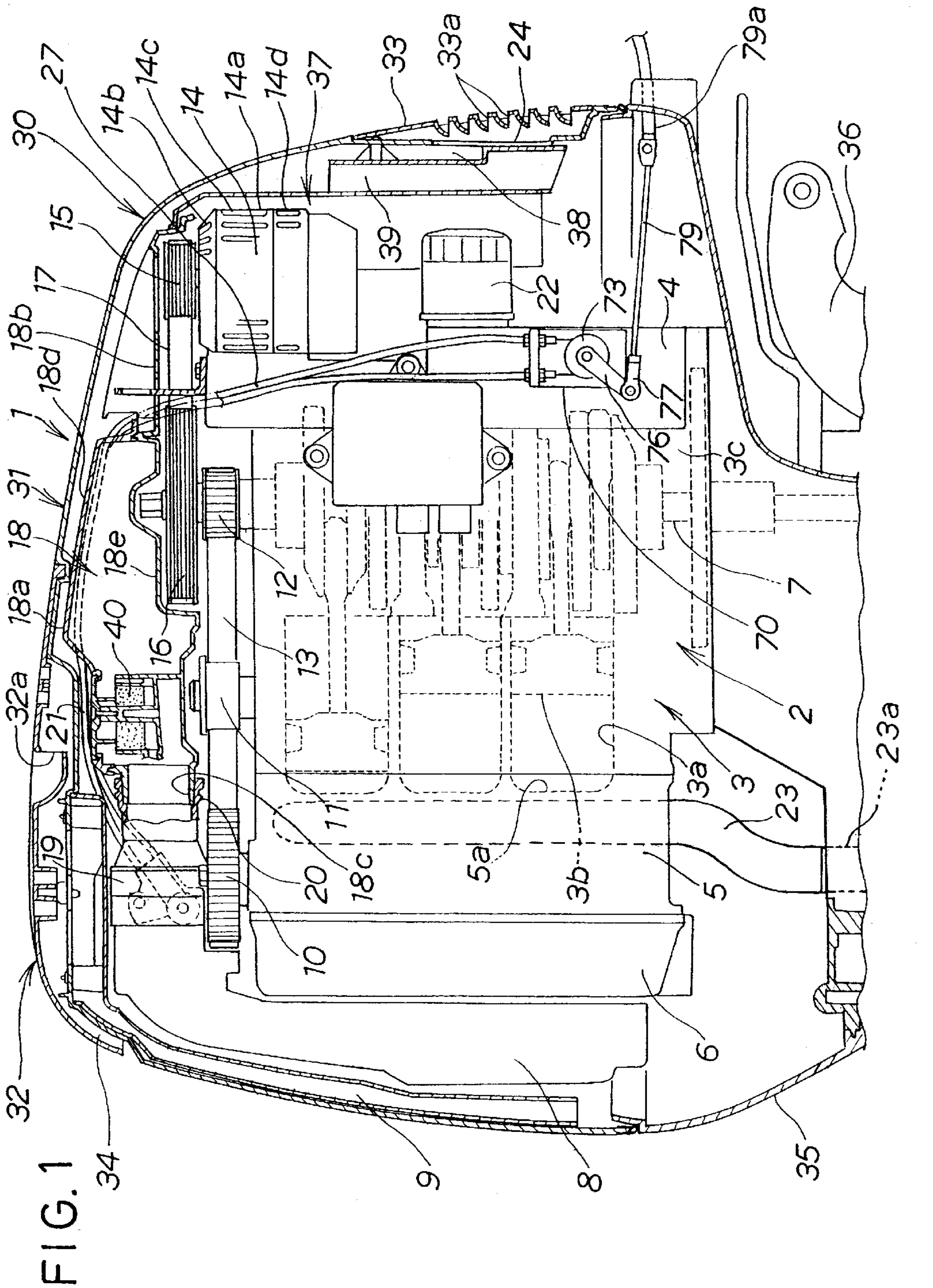
FIG. 1 is a vertical cross-sectional view of an upper part of an outboard motor according to the present invention.

Referring to FIG. 1, an outboard motor 1 includes an engine 2, a cylinder block 3 positioned centrally thereof, a crankcase 4 positioned forwardly of a skirt portion 3*c* of the cylinder block 3, cylinder heads 5, 5 (only one shown) each disposed rearwardly of the cylinder block 3, and cylinder head covers 6, 6 (only one shown) each disposed rearwardly of the respective cylinder heads 5, 5. The engine 2 includes a vertically extending crankshaft 7. Disposed within the cylinder block 3 are two sets of three horizontally oriented cylinders 3*a*. The three cylinders 3*a* of each set are vertically juxtaposed. Pistons 3*b* are fitted within the respective cylinders 3*a*. The pistons 3*b* are connected via connecting rods to the crankshaft 7. Combustion chambers 5*a* are provided within the cylinder heads 5, 5 in correspondence to the number of the cylinders 3*a*.

Figure 2:
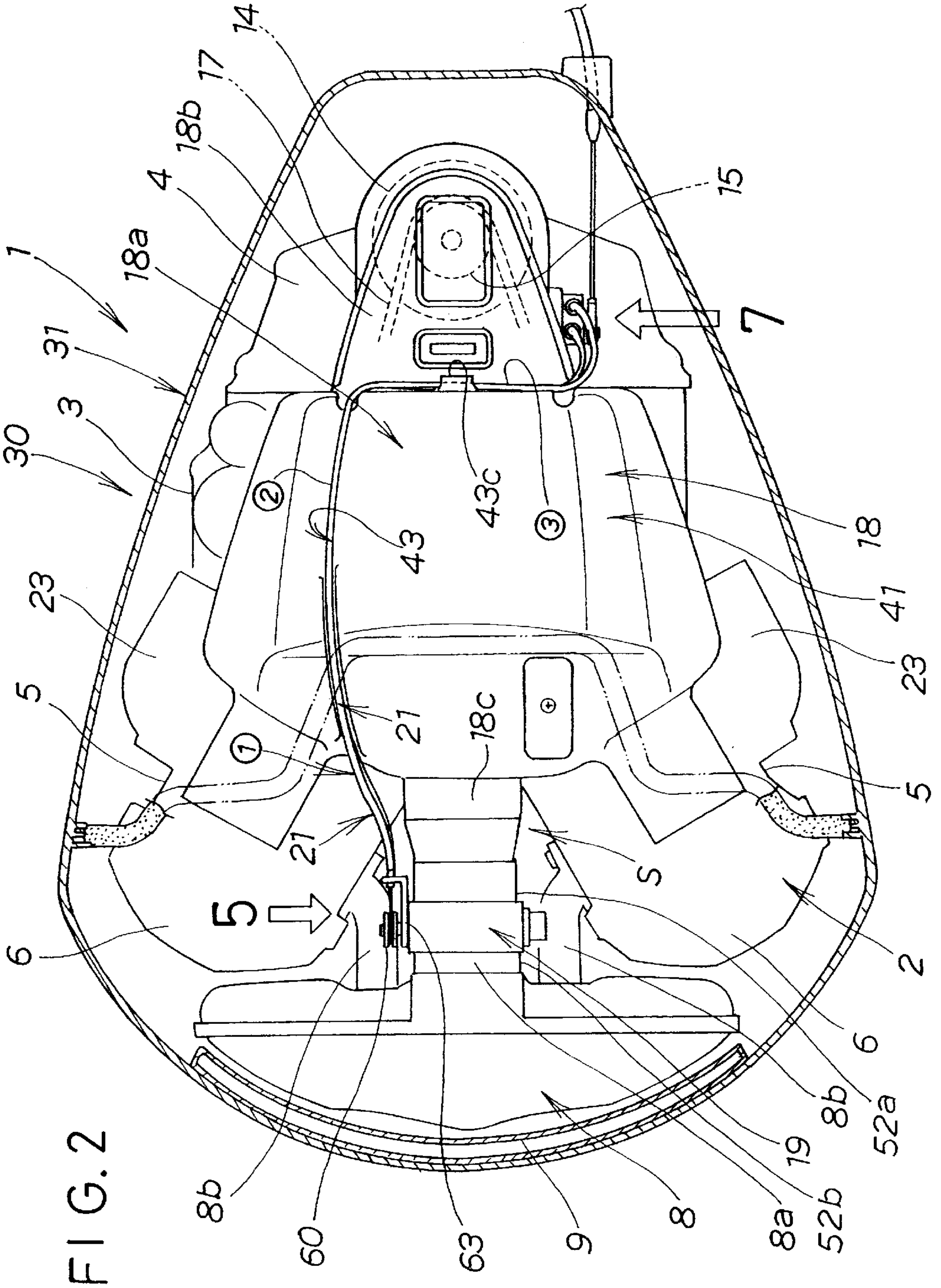
FIG. 2 is atop plan view of the upper part of the outboard motor.

The engine 2 when viewed in top plan provides a V-shaped configuration as shown in FIG. 2.

A vertically extending intake manifold 8 is provided behind the cylinder head covers 6, 6. Provided behind the intake manifold 8 is an intake guide passage 9 through which air drawn from outside the outboard motor 1 passes.

The cylinder head 5 has a camshaft pulley 10 and a pulley cover positioned above an upper surface thereof. A guide pulley 11 is provided above an upper surface of a rear part of the cylinder block 3. Provided above an upper surface of the skirt portion 3*c* is a first driving pulley 12 to be driven by the crankshaft 7. A timing belt 13 extends around the pulleys 10, 12. The crankshaft 7 is arranged to drive a camshaft. A vertically oriented AC generator 14 is attached to a front side of an upper part of the crankcase 4. The generator 14 has plural vertically elongated slits 14*b*, 14*c*, 14*d* formed peripherally of a body 14*a* thereof.

A driven pulley 15 for driving the generator 14 is positioned above an upper surface of the generator 14. At a top end of the crankshaft 7, there is mounted a second driving pulley 16 in vertical alignment with the first driving pulley 12. The second driving pulley 16 is disposed in coaxial relation to the first driving pulley 12.

A timing belt 17 extends around the second driving pulley 16 and the driven pulley 15. Rotation of the crankshaft 7 operates the generator 14.

A box-shaped induction silencer 18 is disposed above the cylinder block 3, the crankcase 4 and the generator 14. The induction silencer 18 has its rear half portion 18*a* positioned above the pulley 16. A front half portion 18*b* of the induction silencer 18 is disposed above the pulley 15.

The induction silencer 18 has a connecting pipe 18*c* formed integrally with a rear part thereof. The connecting pipe 18*c* is connected through a grommet 20 to an upstream portion 52*a* of an intake passage 52 (see FIG. 6) formed in a throttle valve device 19 positioned above a rear part of the engine 2. In other words, the connecting pipe 18*c* communicates with the upstream portion 52*a* of the intake passage 52.

A control cable 21 is arranged to adjust an amount by which a throttle valve 53 (see FIG. 6) of the throttle valve device 19 is opened. The cable 21 extends across an upper surface of the induction silencer 18 to a front side 41*a* (see FIG. 3) of the induction silencer 18. The cable 21 is then bent to extend along the front side 41*a* of the induction silencer 18 and go down the crankcase 4 out of the outboard motor 1, as will be described hereinafter in relation to FIG. 3. An oil filter 22 is positioned below the generator 14. An exhaust pipe 23*a* extends downwardly from the engine 2.

The engine 2 and auxiliary devices attached to the engine 2 are covered with an engine cover 30. More specifically, the engine cover 30 covers the engine 2, the induction box 18, the throttle valve device 19, and the intake manifold 8. The engine cover 30 includes a cover body 31, a top cover 32 for covering a rear part of the engine 2, and a front plate 33 having plural louvers. The top cover 32 is fixed to the cover body 31. The respective adjacent louvers have slits 33*a* formed therebetween.

The top cover 32 has an opening 32*a* formed centrally thereof. An edge forming the opening 32*a* is to be grasped by an operator. A clearance 34 for taking in air from outside the outboard motor 1 is formed between a rear part of the top cover 32 and a rear part of the cover body 31. The top cover 30 is formed by subjecting synthetic resin, or light alloy material such as steel material to press working.

An under cover 35 is connected to a lower end of the engine cover 30. The under cover 35 has an extension case (not shown) connected to a lower end thereof. Below the extension case, there is positioned a gear case (not shown) including a screw propeller (not shown).

The under cover 35 has a stern bracket 36 provided at a front part thereof. The outboard motor 1 is mounted to a stern of a boat via the stern bracket 36. The stern bracket 36 includes a tilt shaft on which the outboard motor 1 is pivotable in an up-and-down direction.

Formed in a lower portion of a front part of the cover body 31 is an opening 24 for taking in air from outside the outboard motor 1. A cover 37 for covering the generator 14 has first and second passageways 38, 39 formed in a lower part thereof. Provided adjacent an upstream portion of the connecting pipe 18*c* of the induction silencer 18 is a filter 40 for removing any mist component from blow-by gas flowing into the cylinder head 5.

Turning to FIG. 2, the engine 2 is a V-6 engine in which the cylinder block 3 and the right and left cylinder head covers 6, 6 are disposed in the form of a V. The right and left cylinder head covers 6, 6 have a space S formed therebetween. The connecting pipe 18*c* is disposed within the space S. The throttle valve device 19 positioned behind the pipe 18*c* is also disposed within the space S. The intake manifold 8 has an intake port 8*a* formed upstream thereof. The intake port 8*a* is also disposed within the space S. The intake port 8*a* communicates with a downstream portion 52*b* of the intake passage 52 of the throttle valve device 19.

The intake manifold 8 has intake pipes 8*b*, 8*b* provided rightwardly and leftwardly of the intake port 8*a*. The intake pipes 8*b*, 8*b* are connected to intake ports of the right and left cylinder heads 5, 5. Exhaust manifolds 23, 23 are connected to the exhaust pipe 23*a*.

Figure 3:
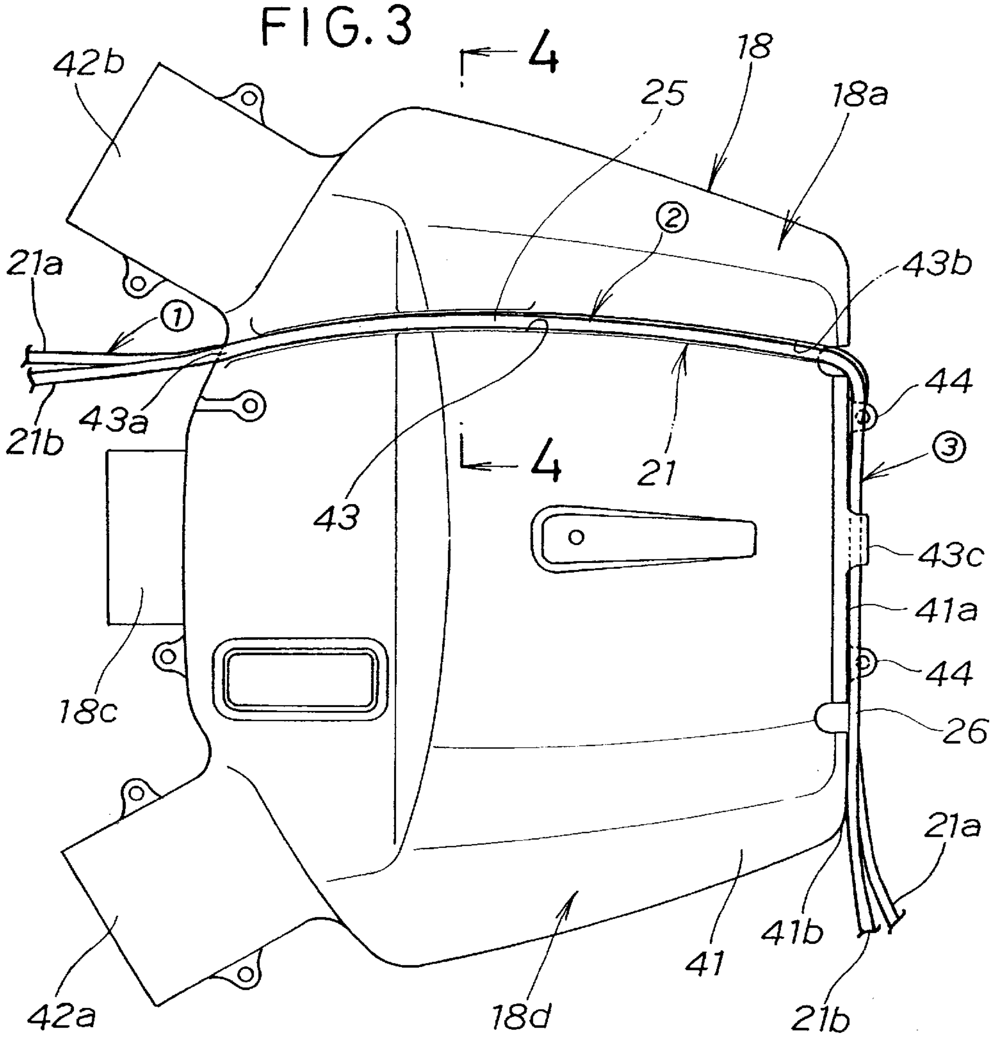
FIG. 3 is a top plan view of an induction silencer of the outboard motor.
Figure 4:
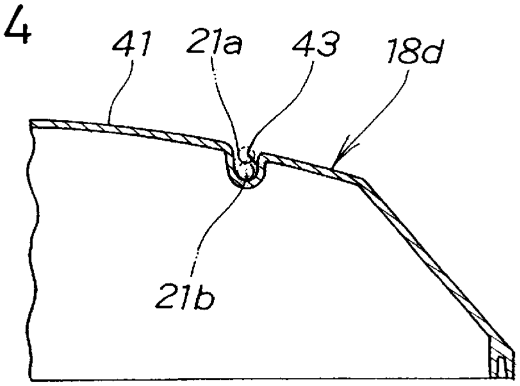
FIG. 4 is a cross-sectional view taken along line 4—4 of FIG. 3.

Reference is made to FIG. 3 and FIG. 4. The rear half portion 18*a* includes an upper member 41. The rear half portion 18*a* includes upper and lower halves 18*d*, 18*e* (see FIG. 1) mated together.

As is apparent from FIG. 3, two cylindrical intake portions 42*a*, 42*b* are provided at opposite ends of a rear part of the upper member 41. The right and left intake portions 42*a*, 42*b* are oriented in directions away from each other. The upper member 41 has an engagement groove 43 formed therein. The groove 43 is upwardly opened and positioned much closer to the left intake portion 42*b* than to the right intake portion 42*a*.

The engagement groove 43 has its front and rear ends 43*a*, 43*b* opened forwardly and rearwardly, respectively. The front side 41*a* of the rear half portion 18*a* is flattened and has a grooved engagement portion 43*c* formed centrally thereof. The engagement groove 43 continues with the front side 41*a*. The front side 41*a* have stays 44, 44 at opposite ends thereof. The stays 44, 44 are joined to a rear end of the front half portion 18*b* (see FIG. 2).

The groove 43 is slightly curved such that it is bowed towards the left intake portion 42*b*. By inserting the control cable 21 into the engagement groove 43 from above, the cable 21 is held or locked in place in the groove 43. The groove 43 has its depth depending upon, for example, an outer diameter of the cable 21. The control cable 21 includes a pushed cable 21*a* and a pulled cable 21*b*. The engagement groove 43 is deepened to such an extent that the cables 21*a*, 21*b* are laid one over the other within the groove 43, as shown in FIG. 4.

The cables 21*a*, 21*b* are partly received in the groove 43 extending across the upper member 41. More specifically, each of the cables 21*a*, 21*b* includes a first cable portion 25 received in the groove 43, a second cable portion 26 continuous with and extending substantially perpendicularly to the first cable portion 25, and a third cable portion 27 (see FIG. 1) continuous with the second cable portion 26. The second cable portion 26 extends along the front side 41*a* to a left end 41*b* of the front end 41*a*. Opposite ends of the second cable portion 26 are immovably held at their lower sides by the stays 44, 44. Central part of the second cable portion 26 is also immovably retained at its upper side by the grooved engagement portion 43*c*. The third cable portion 27 extends downwardly from the left end 41*b* alongside the crankcase 4. The first cable portion 25 extends in a front-and-rear direction of the induction box 18. The second cable portion 26 extends in a right-and-left direction of the induction box 18.

Figure 5:
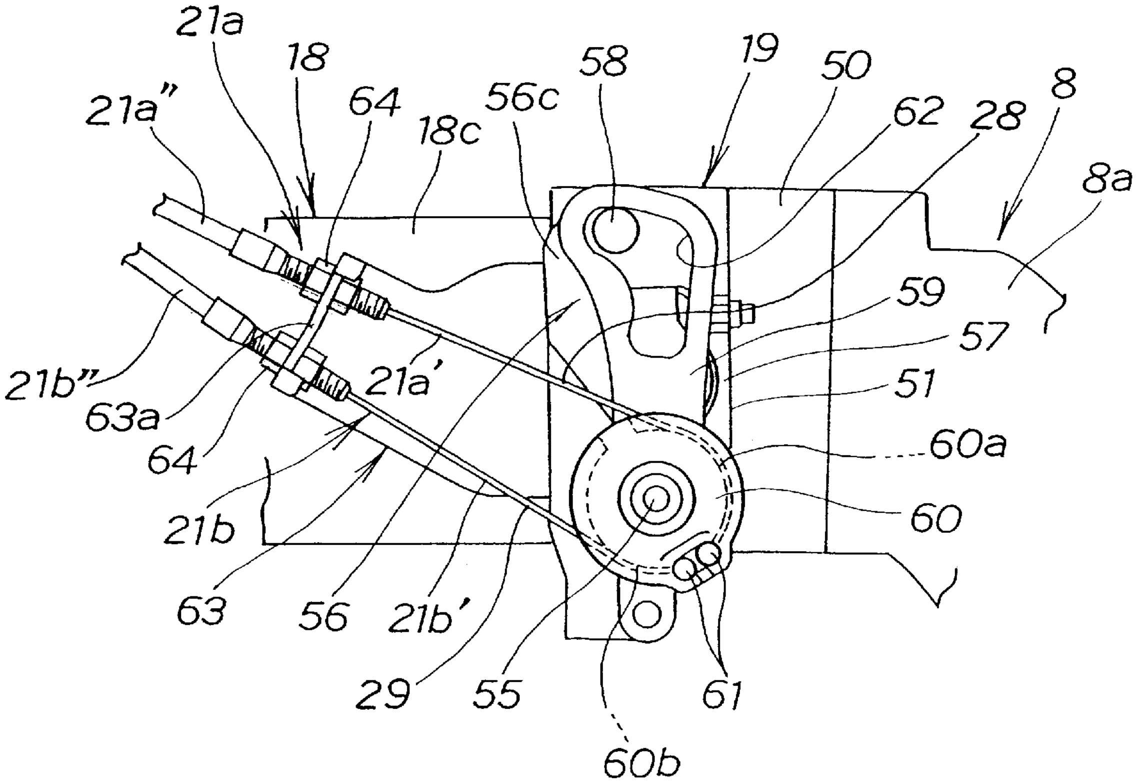
FIG. 5 shows the induction silencer and a throttle valve device as viewed in a direction of an arrow 5 of FIG. 2.
Figure 6:
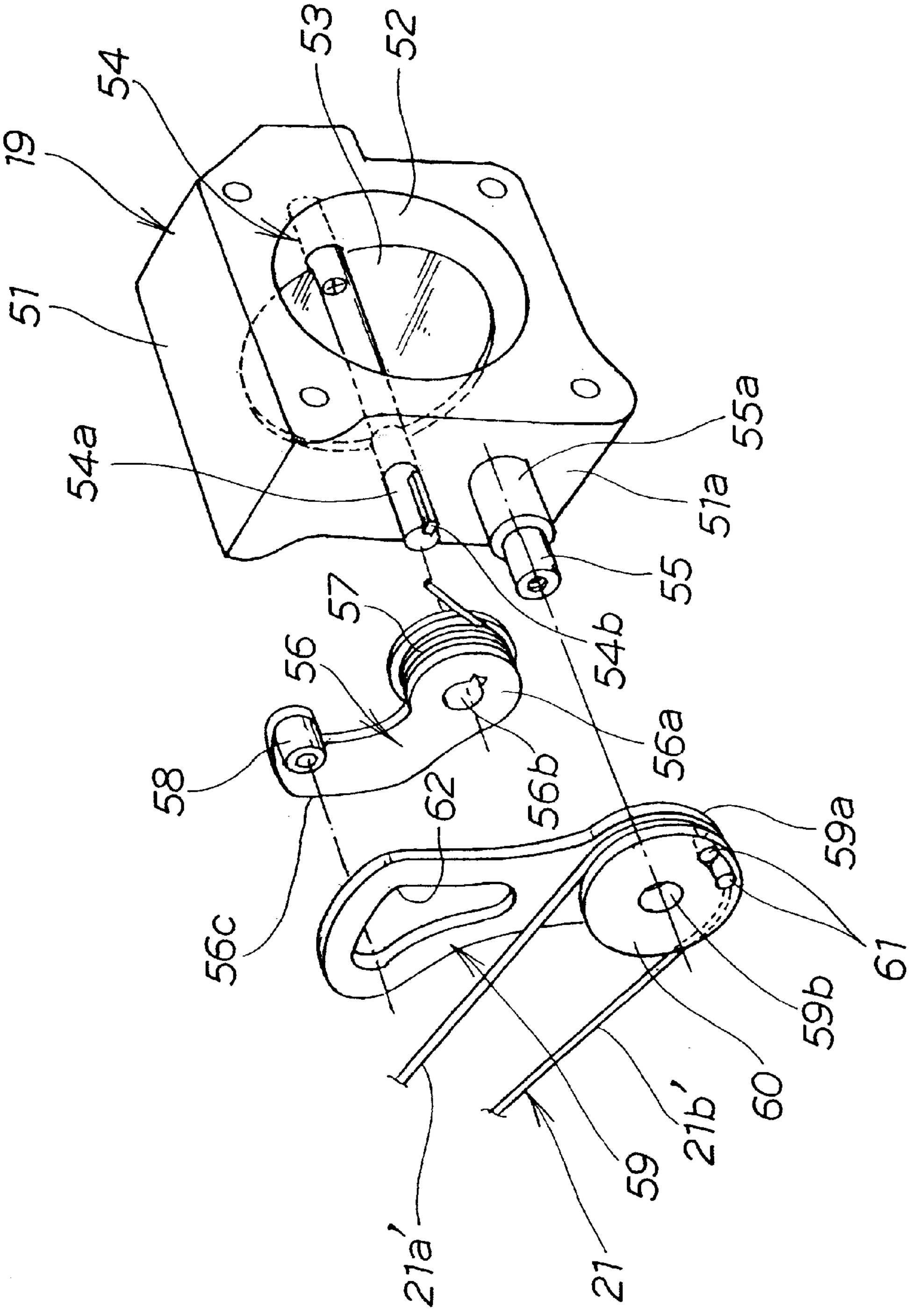
FIG. 6 is an exploded perspective view of the throttle valve device.

With respect to FIG. 5 and FIG. 6, the throttle valve device 19 is interposed between the connecting pipe 18*c* and the intake port 8*a* of the intake manifold 8. The throttle valve device 19 and the intake port 8*a* have a spacer 50 disposed therebetween.

A body 51 of the device 19 has the intake passage 52 formed therein. The passage 52 extends in a front-and-rear direction of the body 51. The throttle valve 53 is fitted within the passage 52. The throttle valve 53 is mounted on a throttle shaft 54. Rotation of the throttle shaft 54 and the throttle valve 53 together controls or regulates an amount the intake passage 52 is opened, whereby an engine speed of the engine 2 is controlled.

The throttle shaft 54 has one end 54*a* projecting from one side 51*a* of the body 51. A boss portion 55*a* attached to the one side 51*a* is positioned below the one end 54*a*. A support shaft 55 protrudes from the boss portion 55*a*.

The one end 54*a* is fitted into a supporting aperture 56*b* formed in a proximal portion 56*a* of a pivotal arm 56. The proximal portion 56*a* has a coil spring 57 wound thereon. The spring 57 has its one end engaged with the proximal portion 56*a*. Another end of the spring 57 is fixed to an engagement portion 54*b* provided at the one end 54*a*. The throttle shaft 54 is urged by the spring 57 in a manner as will be described later.

An engagement pin 58 attached to a distal portion of the pivotal arm 56 projects in a direction away from the body 51.

A cam arm 59 has a supporting aperture 59*b* formed in a proximal portion 59*a* thereof. The support shaft 55 projecting from a lower part of the one side 51*a* of the body 51 is fitted within the supporting aperture 59*b*. The thus arranged cam arm 59 is mounted on the shaft 55. An outer surface of the proximal portion 59*a* has a grooved drum 60 fixed thereto. The cable 21 is fitted in the groove of the drum 60. The groove has an upper groove 60*a* formed along one half the circumference of the drum 60, and a lower groove 60*b* formed along the other. The pushed cable 21*a* includes an inner cable 21*a*' having an upper portion 28 fitted in the upper groove 6O awhile the pulled cable 21*b* includes an inner cable 21*b*' having an upper portion 29 fitted in the lower groove 60*b*. Ends of the upper portions 28, 29 of the inner cables 21*a*', 21*b*' are secured via fastening members 61, 61 to the drum 60.

The cam arm 59 is an elongated sheet member. The cam arm 59 has a cam opening 62 formed therein. The cam opening 62 is substantially doglegged as viewed in side elevation. The engagement pin 58 is disposed in the cam opening 62.

The cable 21*a* includes the inner cable 21*a*' mounted to the drum 60, and an outer member 21*a*" having one end attached via nuts 64, 64 to a support member 63*a* of a stay 63 (see FIG. 2) mounted to the one side 51*a* of the body 51. The cable 21*b* is identical in arrangement to the cable 21*a* and hence its description is omitted.

Turning back to FIG. 2 and FIG. 3, the cable 21 mounted on the one side 51*a* of the throttle valve device 19 extends across the upper member 41, being received in the groove 43, as indicated by arrows ①, ②. The cable 21 is bent at a right angle at the front end 43*b* (see FIG. 3) and extends along the front side 41*a*, as shown by an arrow ③, to the left end 41*b*.

The cable 21 further extends from the left end 41*b* of the front side 41*a* down the crankcase 4, as shown in FIG. 1.

Figure 7:
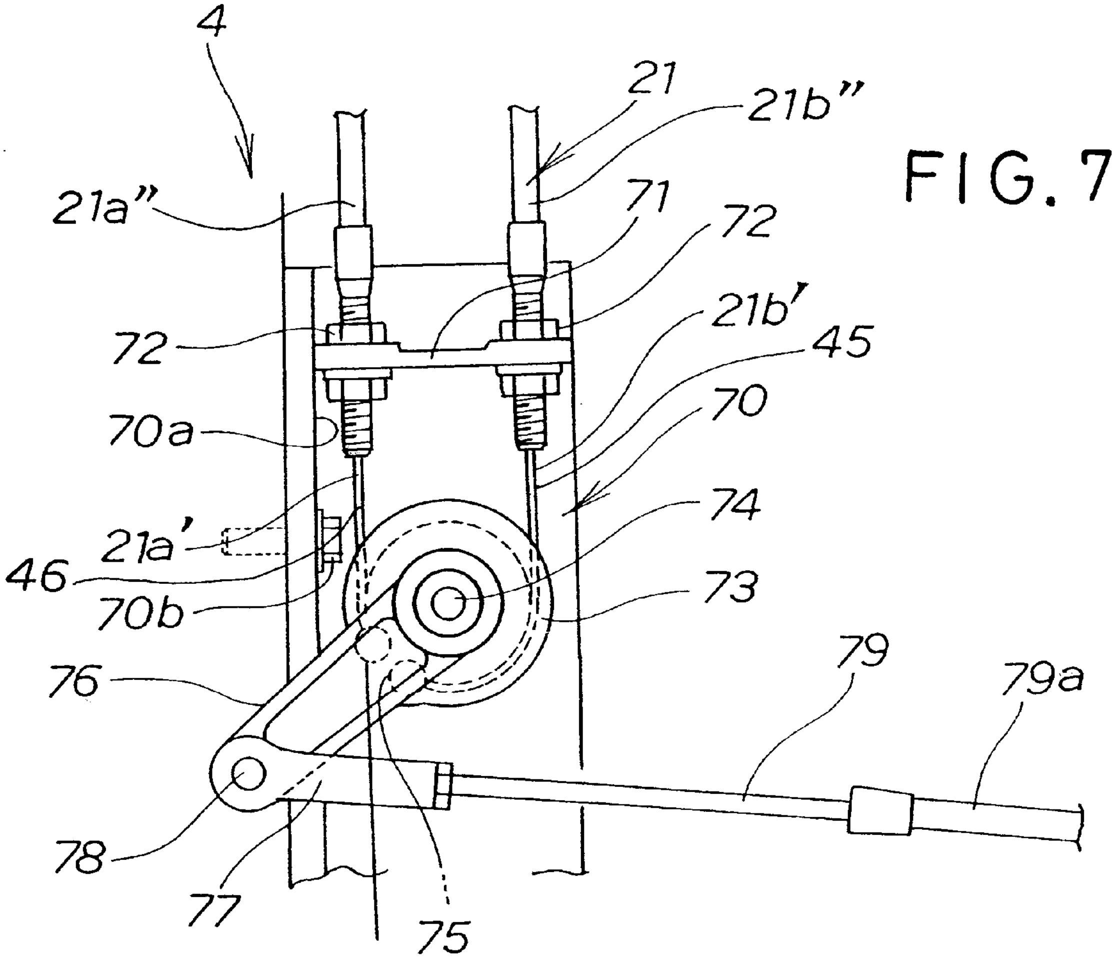
FIG. 7 shows a control cable of the outboard motor as viewed in a direction of an arrow 7 of FIG. 2.

Referring to FIG. 7, a base member 70 is positioned at one side of the crankcase 4 along which the cable 21 extends. The base member 70 has an L-shaped flange portion 70*a* fixedly attached via a bolt 70*b* to the crankcase 4. The outer members 21*a*", 21*b*" have the other ends mounted via nuts 72, 72 and a stay 71 to an upper portion of the base member 70. A rotational drum 73 is mounted through a support shaft 74 to a lower portion of the base member 70.

The cables 21*a*', 21*b*' have lower portions 45, 46 fitted in a groove formed in the drum 73. Ends of the lower portions 45, 46 of the cables 21*a*', 21*b*' are fixed via fastening members 75, 75 to the drum 73.

The drum 73 is connected to a proximal end of an arm 76. The arm 76 has its distal end connected via a pin 78 to one end of a pivotal arm 77. The pivotal arm 77 has another end connected to one end of a single operational cable 79. An outer member 79*a* of the cable 79 extends forwardly from a lower portion of the front part of the under cover 35 out of the outboard motor 1. The outer member 79*a* is connected to a throttle grip provided forwardly of the outboard motor 1.

When the throttle grip is operated to pull or push the operational cable 79, the drum 73 is rotated to pull one of the cables 21*a*', 21*b*' while pushing the other. The drum 60 is therefore rotated to turn the cam arm 59.

When the cam arm 59 is turned clockwise, for example, the pin 58 is caused to move clockwise, simultaneously, such that the pivotal arm 56 pivots clockwise. The clockwise pivotal movement of the arm 56 opens the throttle valve 53. The pivotal arm 56 is arranged to turn back to its original position under a force produced by the spring 57 to thereby close the throttle valve 53.

The present disclosure relates to the subject matter of Japanese Patent Application No. 2001-036081, filed Feb. 13, 2001, the disclosure of which is expressly incorporated herein by reference in its entirety.

What is claimed is:

1. An outboard motor comprising:

an engine;

an induction silencer disposed above said engine;

a throttle valve device disposed adjacent said induction silencer;

an intake manifold disposed adjacent said throttle valve device;

an engine cover for covering said engine, said induction silencer, said throttle valve device, and said intake manifold; and a control cable for opening and closing a throttle valve of said throttle valve device;

said induction silencer including a connecting port communicating with an upstream portion of said throttle valve device;

said throttle valve device having a downstream portion communicating with an upstream portion of said intake manifold;

said control cable including a first cable portion extending over an upper surface of said induction silencer.

2. An outboard motor according to claim 1, wherein said first cable portion extends in a front-and-rear direction of said induction silencer.

3. An outboard motor according to claim 1, wherein said control cable further includes a second cable portion extending in a right-and-left direction of said induction silencer.

4. An outboard motor according to claim 2, wherein said first cable portion is received in an engagement groove formed on the upper surface of said induction silencer.

* * * * *